Dec. 23, 1958  S. BERNSTEIN ET AL  2,866,068
ELECTRICALLY HEATED BUTCHER KNIFE
Filed May 14, 1956
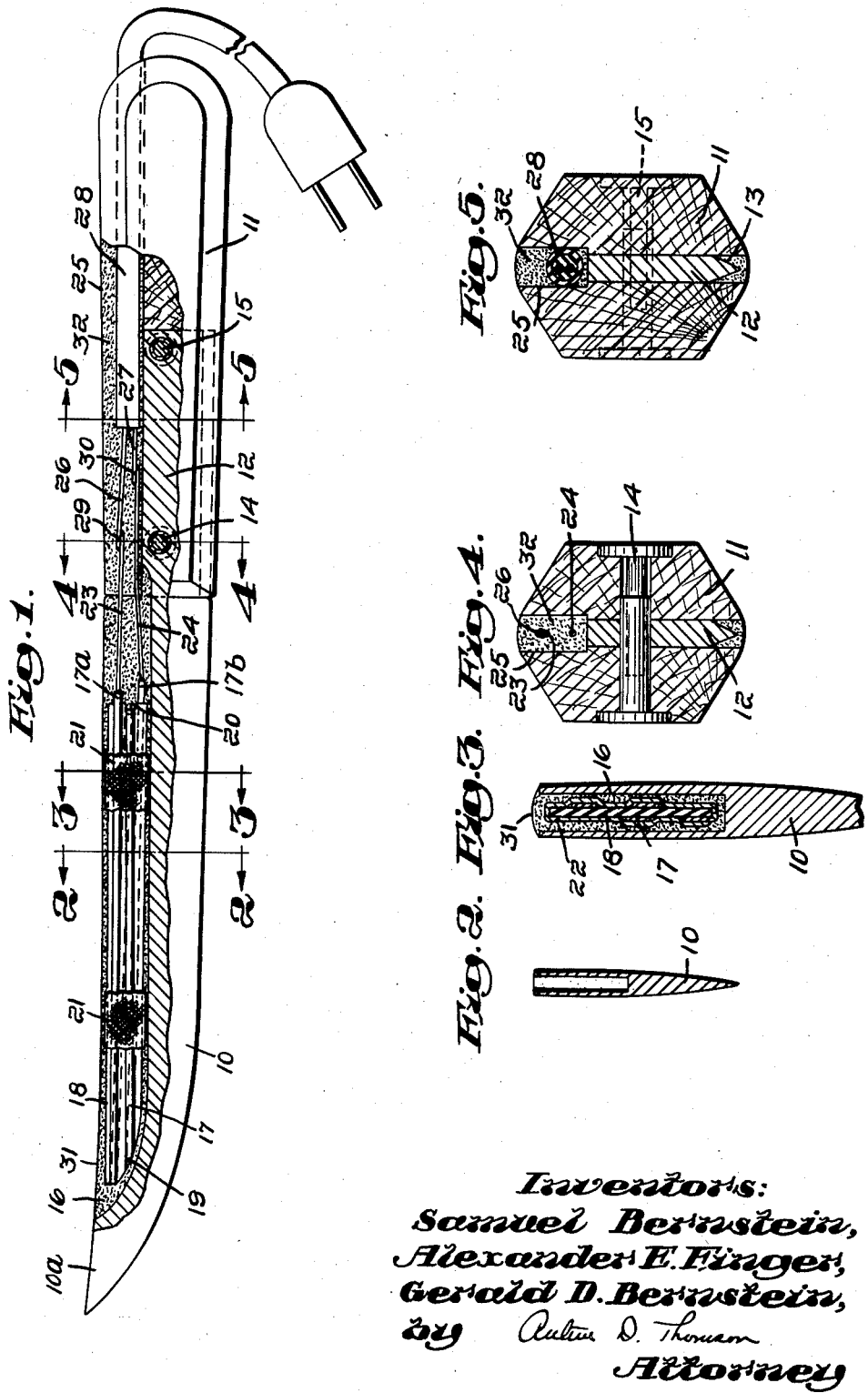
Inventors:
Samuel Bernstein,
Alexander E. Finger,
Gerald D. Bernstein,
by Arthur D. Thomson
Attorney

United States Patent Office 2,866,068
Patented Dec. 23, 1958

2,866,068

ELECTRICALLY HEATED BUTCHER KNIFE

Samuel Bernstein and Alexander E. Finger, Chelsea, and Gerald D. Bernstein, Lexington, Mass.

Application May 14, 1956, Serial No. 584,727

5 Claims. (Cl. 219—21)

This invention relates to electrically heated knives and has for its principal object the production of a heated knife for cutting materials such as frozen foods, and especially meats.

It has hitherto been common practice, in cutting up frozen foods, to heat a knife by dipping it into hot water or by some other external means. This procedure is time consuming, and not very satisfactory, because the knife cools off very rapidly when it comes in contact with the frozen material. Furthermore, it is difficult to cut frozen materials cleanly, for example to do a clean job of carving a large frozen carcass into various cuts, just described. Ordinarily the carcass must be first defrosted and warmed. This involves a long delay, and is often undesirable, if only a part of the carcass is to be used immediately.

It is accordingly the principal object of this invention to produce a knife which is internally heated so that it can be continually maintained at a high enough temperature to cut frozen foods rapidly and cleanly. Other objects are to produce a heated knife which has substantially the same outside dimensions, weight, temper, and balance as standard knives which a butcher is accustomed to using. Other objects are to produce a knife in which the heating element is entirely enclosed, so that the knife can be washed and kept sanitary, and which can be sharpened in the usual manner.

In the drawings illustrating the invention:

Fig. 1 is a side view, partly in longitudinal cross-section, of a knife constructed according to the invention;

Fig. 2 is a cross-section, taken along line 2—2 of Fig. 1, showing the blade before insertion of the heating element;

Fig. 3 is a cross-section taken along 3—3 of Fig. 1;

Fig. 4 is a cross-section taken along line 4—4 of Fig. 1; and

Fig. 5 is a cross-section taken along line 5—5 of Fig. 1.

The blade 10 of the knife is made of steel, in a standard carving knife shape, and is attached to a wood or plastic handle 11. As shown in Figs. 1 and 5, the blade has a rear extension 12 of lesser height than the blade proper or the handle, and the handle has a slot 13 in which the blade extension is received and secured by a pair of rivets 14 and 15 passing through the handle.

Milled along the upper edge of the blade, and extending about half way down, is a slot 16 in which the heater assembly is received. This assembly consists of a flat conductive metal ribbon 17 wound lengthwise around a thin flat mica backer 18 which has front and rear notches 19 and 20 to assist in holding the ribbon in place. A piece of insulating tape 21, of a heat-resistant material such as the glass-based adhesive tape used in toasters and other electrical devices, is wrapped vertically around the mica backer and the ribbon 17. The ends 17a and 17b of ribbon 17 both project to the rear of backer 18 and are soldered to lead wires 23 and 24, respectively, which are preferably lacquered for insulation.

Handle 11 has a slot 25 along its upper edge, and wires 23 and 24 are carried into this slot and are there connected to wires 26 and 27 of a standard electric cord 28 which is brought in through the rear of the handle. The joints 29 and 30 between wires 23, 26 and 24, 27 are preferably staggered from front to rear to keep the thickness requirement for slot 25 to a minimum. Slot 16 is filled, after installation of the heating element, with a suitable grease and moisture-resistant potting compound 31 or electrical cement, which will withstand temperatures up to about 500° F. This filler should be flexible and a good heat conductor. The handle slot 25 is filled, after assembly of the electric parts, with a similar filler 32. The electric element is preferably operated on a low voltage supply, for example about six volts, to eliminate the shock hazard, especially if the knife is to be used in a wet location.

A mica backer of about .008 inch thickness, and a heater ribbon .004 to .005 in thickness and 1/32 in. wide have been found satisfactory. This assembly, along with the glass based tape insulation, can be fitted into a slot .045 in. wide milled in a standard carving knife blade about 3/32 in. thick along the back edge. It will be noted that the slot 16 extends less than half way down the blade and stops short of the tip 10a of the blade and follows the contour of the tip so as to leave about the same depth of solid stock all along the cutting edge of the blade. The blade is strong enough to be used for carving in the normal manner and can be repeatedly sharpened in the usual manner. As all the electric parts are enclosed, the knife blade can be readily washed and kept sanitary. The electrical elements are very light and do not appreciably affect the balance and weight of the knife. Furthermore, the winding of the ribbon 17 lengthwise about the mica backer, rather than cross-wise or around the narrow dimension of the backer, as is the ordinary practice, results in a heating element which is extremely flexible and will bend readily with the blade.

By means of this knife a butcher can carve meat from a frozen carcass quickly and cleanly, using the same technique as he would on unfrozen meat. The various cuts can be kept frozen during and after carving so that the butcher can cut up the meat at his convenience without risk of loss from spoilage.

The knife has been described with especial reference to carving meats. It is understood, however, that the knife can be used to advantage in cutting other frozen materials, wherever a smooth, thin, flexible knife, which can be kept evenly heated, will facilitate the cutting operation.

What is claimed is:

1. An electrically heated knife blade assembly comprising a one piece relatively thin, smooth-sided blade having a cutting edge, a back edge, and a slot longitudinally disposed along said back edge and extending into the blade part way toward said cutting edge, the remainder of the blade being solid, a thin, substantially flat electric heating element disposed in said slot flatwise with respect to the blade, and sealing means filling in said slot around said element said entire assembly being flexible.

2. An electrically heated knife comprising a relatively thin, smooth-sided, flexible blade having a cutting edge, a back edge, a tip, and a rear end, said blade also having a slot longitudinally disposed along said back edge, said slot commencing at said rear end and stopping short of said tip and extending into the blade part way toward said cutting edge, the remainder of the blade being solid, a thin, flat, flexible backer piece of insulating material disposed in said slot flatwise with respect to the blade, a flat, flexible ribbon-like electric heater element wound flat around said backer piece substantially parallel to the longitudinal direction of the blade, a handle attached to said rear end said slot being disposed forward of said handle, and means in said handle providing electrical connection to said element.

3. A knife as described in claim 2, said cutting edge being curved toward said tip, and said slot having a correspondingly curved forward end.

4. An electrically heated knife comprising a one piece relatively thin, smooth-sided, flexible blade having a cutting edge, a back edge, and a slot longitudinally disposed along said back edge and extending into the blade part way toward said cutting edge, the remainder of the blade being solid, a thin, flat, flexible backer piece of insulating material disposed in said slot flatwise with respect to the blade, a flat, flexible ribbon-like electric heater element wound flat around said backer piece, a handle attached to said blade, said handle having a slot aligned with and forming a continuation of the slot in said blade, a pair of conductors connected to said heater element and passing from the slot in said blade into the slot in said handle, electrical connections to said conductors disposed in the latter slot, and insulating sealing means filling in said slots.

5. A flexible electric heating device comprising an elongated thin, flat, flexible insulating backer piece having a longitudinal direction and a transverse direction, a flat, flexible ribbon-like electric heater element wound flat around said backer piece in the longitudinal direction thereof, and a flexible insulating wrapper disposed around said element and backer piece.

References Cited in the file of this patent

UNITED STATES PATENTS

| 1,658,884 | Cusick | Feb. 14, 1928 |
| 2,032,688 | Dart | Mar. 3, 1936 |
| 2,110,985 | Jacobson | Mar. 15, 1938 |
| 2,623,977 | Weiskopf | Dec. 30, 1952 |

FOREIGN PATENTS

| 270,684 | Switzerland | Dec. 1, 1950 |
| 1,107,332 | France | Aug. 3, 1955 |